July 28, 1931.   J. R. THORP   1,816,268
LOCKING DEVICE
Filed June 16, 1928

Inventor
J. R. Thorp
by W. H. Lieber
Attorney

Patented July 28, 1931

1,816,268

UNITED STATES PATENT OFFICE

JOEL R. THORP, OF WEST ALLIS, WISCONSIN, ASSIGNOR TO THE FULTON COMPANY, OF WEST ALLIS, WISCONSIN, A CORPORATION OF WISCONSIN

LOCKING DEVICE

Application filed June 16, 1928. Serial No. 285,793.

The present invention relates generally to improvements in the art of fastening or locking machine elements to their supports, and relates more specifically to improvements in the construction and operation of devices for preventing the unauthorized removal of wheels and tires from the normal supporting structure thereof.

A general object of the invention is to provide an improved locking device which is simple, compact and rigid in construction, and which is also highly effective in operation.

Another object of the invention is to provide a new and useful appliance which is adapted to securely lock the wheel of a vehicle in position upon its support, and which simultaneously confines the valve cap and stem of a tire associated with the wheel rim, against possible release so as to permit removal of the tire without destruction thereof.

A further object of the invention is to provide an improved spare wheel and tire locking accessory which covers or conceals relatively unsightly nuts and valve structures thus presenting an extremely neat appearance, and which may be applied and removed with minimum effort.

Still another object of the invention is to provide a sturdy locking appliance which will snugly fit the parts of automobiles of standard construction without necessitating modification in the structure thereof, and which may be manufactured and sold at moderate cost.

Another object of the invention is to provide an improved locking device which is especially applicable as an accessory to Ford cars for the purpose of preventing unauthorized removal of the spare wheels, or of elements associated with these wheels, and possible deflation of the spare tires of such automobiles.

These and other objects and advantages of the present invention will be apparent from the following detailed description.

Some of the novel features of wheel and tire locking structure shown but not specifically claimed herein, form the subject of co-pending application Serial No. 258,492, filed March 2, 1928, over which the present invention is an improvement.

A clear conception of one embodiment of the present improvement and of the manner of constructing and of attaching appliances built in accordance therewith, may be had by referring to the drawing accompanying and forming a part of this specification wherein like reference characters designate the same or similar parts in the various views.

Figure 1:
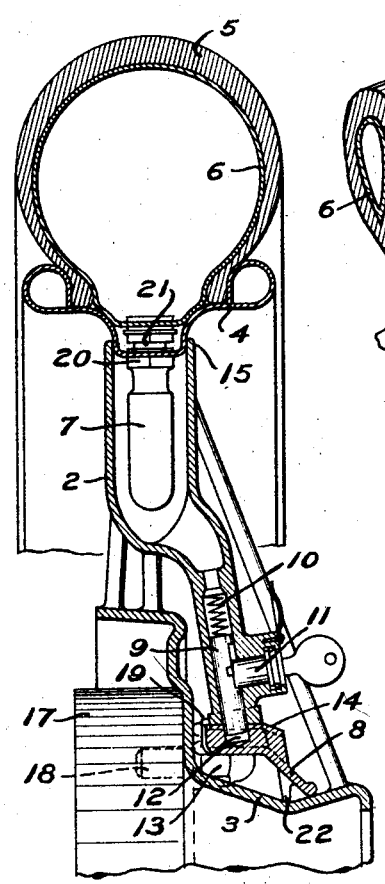
Fig. 1 is a fragmentary central vertical section through the tire and wheel and through the improved locking device associated therewith.

The wheel to which the improvement has been applied herein by way of illustration, comprises a sheet metal hub 3, a sheet metal tire supporting rim 4 surrounding the hub 3, and a plurality of wire spokes rigidly connecting the hub and the rim. The wheel hub 3 is provided with a series of holes which are adapted to receive the retaining studs 18 secured to the carrier or support 17, and a series of nuts 13 cooperating with the studs 18 serve to clamp the wheel to the support 17. The wheel rim 4 provides a support for the tire casing 5 which encloses an inner tube 6 having a valve stem 21 extending inwardly through a hole in the rim 4. A clamping nut 20 coacting with the stem 21 and with the rim 4, serves to retain the valve in fixed position, and a valve cap 7 having screw thread coaction with the retaining nut 20 may be utilized for the purpose of enclosing and of thus protecting the valve stem 21. The construction of the wheel, tire and supporting structure just described, is relatively standard and is therefore well known.

The improved locking device constituting the present invention comprises in general an outer tubular element 2 having its outer end provided with a valve stem confining socket, and having its inner end provided with a suitable lock; and an inner hub and nut engaging element 8 cooperable with the tubular element 2 to form a single strut adapted to span the gap between the wheel hub 3 and the rim 4.

The socketed outer end of the element 2 may be provided with spaced projections 15 which are formed to snugly engage the opposite sides of the inner ridge of the rim 4, and which may be surfaced with rubber or leather in order to insure a snug fit. The outer end of the element 2 may be additionally provided with recesses for confining compression springs 16 the outer ends of which coact with the innermost portion of the rim 4 through rubber buffers. The inner end of the tubular element 2 is bored to receive a locking bolt or latch 9 which is normally urged toward the wheel hub by means of a compression spring 10. A cylinder lock 11 coacts with the latch 9 in a manner to retract the latch against the action of the spring 10, when it is desired to remove the locking device from the wheel while permitting the spring 10 to normally urge the latch 9 beyond the end of the element 2.

Figure 2:
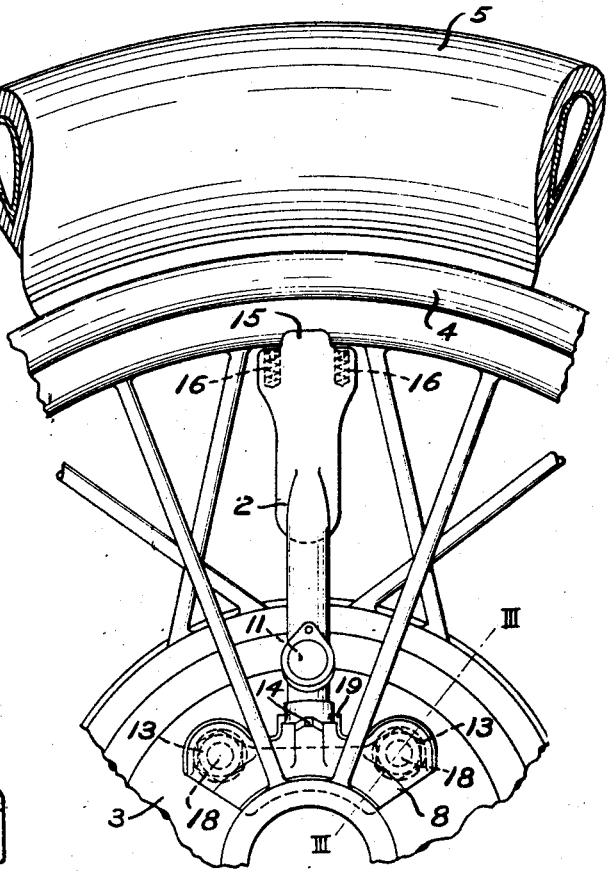
Fig. 2 is a fragmentary rear elevation of a metal wheel and of a tire associated therewith, showing the improved locking device applied thereto.
Figure 4:
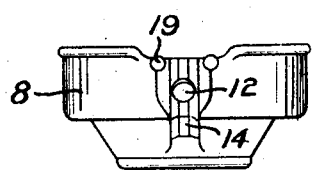
Fig. 4 is a top view of the hub engaging element of the improved locking device.
Figure 3:
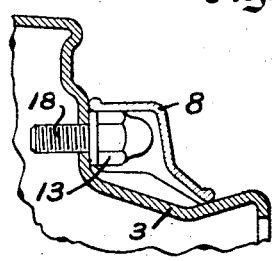
Fig. 3 is a fragmentary radial section through the wheel hub and through the hub engaging element of the locking device, the section being taken along the line III—III of Fig. 2.
Figure 6:
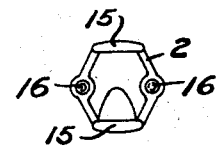
Fig. 6 is a view looking directly toward the upper end of the tubular valve stem concealing element of the improved locking device.
Figure 5:
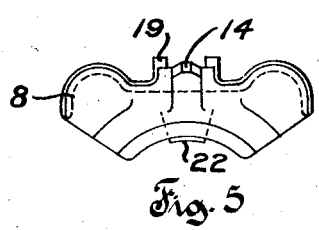
Fig. 5 is a rear elevation of the hub engaging element of the improved locking device.

The inner hub and nut engaging element 8 has side depressions which are adapted to snugly engage the upper clamping nuts 13 as shown in Figs. 2 and 3, and is provided with a central strut or lug 22 formed to directly engage the wheel hub 3 as shown in Fig. 1. Three point contact is thus provided for the element 8 the outermost central portion of which has a guide ridge 14 adapted to coact with a central recess in the innermost end of the element 2. The element 8 is also formed with a central hole 12 for receiving the end of the locking latch 9, and has a pair of integral stop lugs 19 for relatively positioning the elements 2, 8 so that the hole 12 is in alinement with the latch 9 when the device has been assembled.

When applying the improved locking device to a wheel and tire, it is only necessary to set the inner element 8 in position over the clamping nuts 13 and upon the rim 3, and to slip the socketed outer end of the tubular element 2 over the valve stem and cap 7, whereupon the inner end of the element 2 may be pressed rearwardly over the guide ridge 14 until it strikes the stop lugs 19 thereby permitting the latch 9 to snap into the hole 12 and thus locking the elements in assembled position. With the device thus assembled, the clamping nuts 13 and the valve retaining nut 20 are concealed and inaccessible for manipulation, so that these nuts which retain the wheel and the tire tube 6 in position, cannot be removed. If, however, it is desired to remove the locking device, the key may be inserted in the lock 11 and manipulated to retract the latch 9 from the hole 12, whereupon the inner end of the element 2 is free to be drawn outwardly so as to enable subsequent removal of the elements in an obvious manner.

When the improved locking device has been properly applied, the nuts 13, 20 are not only concealed from sight and against possibility of removal, but the tire valve is also hidden from sight thereby preventing unauthorized deflation of the tire without puncturing the same. The formation of the element 3 with three point contact, and the provision of the projections 15 and springs 16 at the outer end of the tubular element 2, insures a snug fit between the locking device and the adjoining structure and prevents possibility of rattling. The appliance presents a neat and finished appearance and may be readily applied between the wire spokes as shown. The elements 2, 8 may be constructed in any desired manner and due to their symmetrical formation provide a sturdy strut like structure constituting an added attraction for the car. The improved appliance is readily applicable as an accessory to standard Ford automobiles and effectively accomplishes its intended purpose.

It should be understood that it is not desired to limit the invention to the exact details of construction herein shown and described, for various modifications within the scope of the appended claims, may occur to persons skilled in the art.

It is claimed and desired to secure by Letters Patent:—

1. A device of the class described comprising, a tubular element formed to conceal the valve of a tire carried by a wheel rim and having projections coacting with inner and outer side portions of said rim, another element formed to have three point contact with the hub and clamping structure of the wheel, and means for rigidly uniting and locking said elements after assemblage thereof between the rim and hub of the wheel.

2. In combination with a wheel having a hub and a rim separated by a space, a tire associated with said rim and having a valve protruding into said space, means including spaced nuts for clamping said hub to a support, an element directly engaging said nuts and said hub, another element engaging said rim adjacent to said valve, and a snap latch carried by the end of one of said elements within said space and cooperating with the abutting end of the other to retain said elements in assembled position.

3. In combination with a wheel having a hub and a rim, clamping means for securing said hub to a support, an element enclosing said clamping means and having a hole facing said rim, a second element engaging said rim and having a latch engageable with said hole to lock said elements together, and means for centering said latch relative to said hole.

4. In combination with a wheel having a hub and a rim, a plurality of spaced nuts coacting with said hub, an element coacting with at least two of said nuts, a second element coacting with said rim and with said first mentioned element mid-way between said nuts, and a snap latch confined within the end of one of said elements and cooperable with a hole in the end of the other to lock said elements together.

5. In combination with a wheel having a hub and a rim, a hub engaging element, a rim engaging element, a latch projecting from an end of one of said elements, means for constantly urging said latch into an end hole in the other of said elements to lock said elements in assembled position, and means for retracting said latch to dismantle said elements.

6. In combination with a wheel having a hub and a rim, a hub engaging element, a rim engaging element spanning the gap between said hub engaging element and said rim, means for locking said elements together, a pair of spaced projections on said rim engaging element cooperable with inner and outer side portions of said rim, and resilient means coacting with said rim engaging element and with said rim midway between said projections.

7. A wheel locking device comprising, a tubular element formed to completely conceal the valve and valve nut of a tire carried by a wheel rim and having projections coacting with inner and outer side portions of said rim, another element formed to coact with the hub clamping nuts of the wheel, and means for locking said elements together after assemblage thereof between the rim and hub of the wheel.

8. A wheel locking device comprising, a tubular element formed to embrace the valve of a tire carried by a wheel rim and having projections coacting with inner and outer side portions of said rim, another element formed to coact with the hub clamping nuts of the wheel, and means for locking said elements together after assemblage thereof between the rim and hub of the wheel.

9. In combination with a wheel having a hub and a rim, a tire associated with said rim and having a valve protruding therefrom, a tubular element completely enclosing said valve, a member coacting with said hub and abutting the inner end of said element to hold the latter in position over said valve, and locking means between said element and said member.

10. In combination with a wheel having a hub and a rim, clamping nuts for securing said hub to a support, an element enclosing said nuts and having a hole facing said rim, a second element engaging said rim and having a latch engageable with said hole to lock said elements together, and locking means for releasing said latch to effect removal of said elements.

In testimony whereof, the signature of the inventor is affixed hereto.

JOEL R. THORP.